United States Patent [15] 3,668,186
Duncan et al. [45] June 6, 1972

[54] COMPOSITION FOR LOWERING THE RELEASE TEMPERATURE OF PHENOL- AND LOWER ALKYL SUBSTITUTED PHENOL-BLOCKED ISOCYANATES

[72] Inventors: Joe S. Duncan, Mogadore; Otto C. Elmer, Akron, both of Ohio

[73] Assignee: The General Tire & Rubber Company

[22] Filed: Apr. 17, 1970

[21] Appl. No.: 29,648

[52] U.S. Cl.................260/75 NC, 252/182, 260/77.5 NC, 260/77.5 TB, 260/858
[51] Int. Cl. ...................................C08g 22/34, C09k 3/00
[58] Field of Search.................252/182; 260/2.5 AC, 75 NC, 260/77.5 AC, 77.5 TB

[56] References Cited

UNITED STATES PATENTS

| | | | |
|---|---|---|---|
| 3,471,423 | 10/1969 | Elmer et al. | 260/22 |
| 3,267,078 | 8/1966 | Damusis | 260/77.5 |
| 3,317,463 | 5/1967 | Schonfeld et al. | 260/47 |
| 3,509,103 | 4/1970 | Teaque et al. | 260/77.5 |
| 2,973,361 | 2/1961 | Rudner | 260/268 |
| 3,010,963 | 11/1961 | Elmer | 260/268 |
| 3,150,138 | 9/1964 | Miller | 260/268 |
| 3,546,233 | 12/1970 | Szmuszkoniz et al. | 260/293 |

OTHER PUBLICATIONS

Condensed Chemical Dictionary, 7th Ed., Reinhold, N. Y., 1966, pages 814 and 822– 823.

Primary Examiner—Donald E. Czaja
Assistant Examiner—H. S. Cockeram
Attorney—Frank C. Rote, Jr.

[57] ABSTRACT

In the preparation of urethane polymers from phenol- and lower alkyl substituted phenol-blocked isocyanates, it is known to use a variety of reagents such as organotin compounds or amine compounds to lower the temperature at which the isocyanate becomes unblocked or reactive. These compounds, however, cause various side effects such as a decrease in the heat stability of the resultant polyurethane. This invention concerns a novel combination of certain tetravalent organotin compounds and certain quaternary ammonium compounds for addition to a phenol- or lower-alkyl substituted phenol-blocked isocyanate system to produce a synergistic lowering of the unblocking temperature in addition to, in the case of a coating compound, providing an unexpected increase in the heat stability of the resultant polyurethane coating.

16 Claims, No Drawings

COMPOSITION FOR LOWERING THE RELEASE TEMPERATURE OF PHENOL- AND LOWER ALKYL SUBSTITUTED PHENOL-BLOCKED ISOCYANATES

BACKGROUND OF THE INVENTION

1. Field of the Invention

This invention relates to the field of urethane chemistry. More particularly, this invention concerns phenol- and lower-alkyl substituted phenol-blocked isocyanates and their utilization in urethane reactions.

2. Description of the Prior Art

In the field of urethane chemistry, it is known to use polyisocyanate compounds wherein the NCO groups are temporarily restrained from reaction (U.S. Pat. No. 2,801,990). Generally, the highly reactive NCO groups of the isocyanate will quickly react with compounds containing labile hydrogen atoms (compounds which give a positive Zerewitinoff test*)(*The Zerewitnoff test involves addition of the compound in question to a Grignard solution of methyl iodide; a positive test occurs when the compound decomposes the Grignard reagent to liberate methane gas.) over a wide temperature range to form a polyurethane; by temporarily blocking or masking these reactive NOC groups, isocyanates may be admixed with labile hydrogen containing compounds and the resultant mixture more conveniently handled. This practice is employed where the exigencies of the process or other reaction moieties are such that it is not desirable to have the polyurethane-forming reaction occur immediately upon mixing. For instance, in the field of coatings it is more desirable to pass the substrate to be coated through a bath of coating reactants and then cure the coating at a later stage. Another example would be where a urethane adhesive is used in a flocking operation; obviously it is more desirable to have the adhesive remain unreactive during flocking and then later react or cure to fully bond the flock to the substrate.

In these situations the blocked isocyanate must be capable of being regenerated, i.e., the highly reactive NCO groups must be capable of being unblocked so that they may react with the labile hydrogen atoms to form the polyurethane. As a rule, the blocking agents are compounds that are weakly bonded to the NCO group and are amenable to be dissociated therefrom; the isocyanate may be regenerated or unblocked by merely applying sufficient heat to cause this dissociation. Examples of these dissociatable blocking agents include tertiary alcohols, secondary aromatic amines, mercaptans, lactams, imides, monohydric phenols and others; phenol and lower alkyl substituted (ortho, para, and meta) phenols such as paracresol are by far the most popular of the blocking agents.

Generally, an isocyanate is blocked by treating it with the blocking agent in an inert liquid medium at relatively low temperatures (i.e. 25° C. to 150° C.) and optionally in the presence of a small amount of a catalyst such as a tertiary amine. The recovered product is chemically inert over a wide temperature range and may be mixed with most labile hydrogen-containing compounds without fear of reaction. Admixtures made from these blocked isocyanates may thereafter be made fluid with liquids, granulated with powders, or otherwise compounded and used in a variety of processes such as for dipping, spraying, painting, molding, for a wide range of uses in addition to coatings such as in insecticides, herbicides, and pharmaceuticals.

Blocked isocyanates have rather high release temperatures. For example, Hylene MP, a phenol-blocked methylene bis (4-phenyl isocyanate) commercially available from E. I. du Pont de Nemours & Company, has a release temperature of 150° C.; Isonate 123P, a caprolactam-blocked methylene bis (4-phenyl isocyanate) commercially available from Upjohn Company, has an unblocking or release temperature of 138° C.; Mondur S, a phenol-blocked adduct of 2,4-toluene diisocyanate and trimethylol propane, commercially available from Mobay Chemical Company, has an unblocking temperature of 170° C.; and Mondur SH, a cresol-blocked adduct of 2,4-toluene diisocyanate and trimethylol propane and commercially available from Mobay Chemical Company, has an unblocking temperature of 143° C.

These high release temperatures are frequently unmanageable and cause deterioration and degradation of other reaction moieties or process components such as the substrate to which the compound is applied, the flocking material, and so forth, as well as being uneconomical. It has therefore become conventional practice to incorporate into the blocked isocyanate system (i.e. blocked isocyanate and labile hydrogen containing compound) a reagent that will effectively lower the temperature at which the blocking agent will dissociate. For instance, it is known to incorporate certain amine compounds (U.S. Pat. Nos. 2,916,403 and 3,267,078) and to incorporate certain organotin compounds (U.S. Pat. No. 3,205,201 and Australian complete specification 50757/64) to lower the release temperatures of blocked isocyanates. These reagents, however, produce a number of undesirable side effects. Divalent organotin compounds usually have a short pot or shelf life and lose their unblocking effectiveness after about 24 hours in the blocked isocyanate system so that dip tanks and other containers of these thus treated compounds must be constantly replenished with the organotin compound to retain the proper unblocking temperature. Certain tetravalent organotin compounds, such as dibutyl tin dilaurate, give sufficient lowering of release temperature but only when high concentrations are used and such high concentrations cause a lowering of the heat stability of the resultant polyurethanes. The general use of tertiary amine compounds has been known to cause serious reductions in the heat stability of the resultant polyurethane. For these and other reasons, a need exists in the art for a compound for use with blocked isocyanates that will not only lower the release temperature but that will have a long effective (pot) life and that will not deteriorate the heat stability or other properties of the resultant polyurethane.

This invention is based on the surprising discovery that certain tetravalent organotin compounds in combination with certain quaternary ammonium compounds in ratios of between about 80 to 20 parts of the former to about 20 to 80 parts of the latter, and in small quantities will produce a synergistic lowering of the release temperature of phenol- or lower-alkyl substituted phenol-blocked isocyanates and in addition have a long pot life and further, in coating compounds, cause a serendipitous increase in the heat stability of the cured compound.

Therefore, the main object of this invention is a composition for effectively lowering the release temperature of phenol- or lower-alkyl substituted phenol-blocked isocyanates. Other objects include a method of maintaining a low release temperature for phenol-blocked isocyanate reaction systems over a long time period, a method of treating these isocyanate compounds to lower the release temperature thereof in combination with increasing the heat stability of the coatings made therefrom, and a method of obtaining a polyurethane polymer from a phenol or lower-alkyl substituted phenol-blocked isocyanate reaction system that exhibits an acceptable heat stability.

SUMMARY OF THE INVENTION

This invention concerns a composition for admixture to a phenol- or lower-alkyl substituted phenol-blocked isocyanate reaction system, that is, a phenol-blocked isocyanate in combination with a reaction hydrogen-containing compound and optionally a solvent therefore, for lowering the temperature at which the blocked isocyanate becomes reactive or is released for reaction with the active hydrogens in the other compound to form a polyurethane wherein the compound comprises a mixture by weight of:

a. about 20 to about 80 parts of compound A, which compound conforms to the formula:

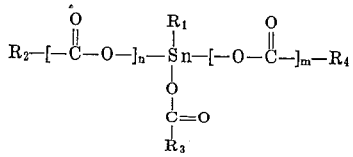

wherein $R_1$, $R_2$, $R_3$, and $R_4$ are alkyl radicals containing to about 24 carbon atoms, wherein $n$ may be 0 or 1, and wherein $m$ may be 0 or 1; and b. about 80 to about 20 parts of compound B, which compound conforms to the formula:

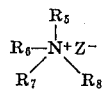

wherein $R_5$, $R_6$, $R_7$, and $R_8$ are organic radicals, containing one to about 24 carbon atoms and are selected from the group consisting of alkyl and aralkyl radicals, wherein Z is an anion selected from the group consisting of ortho diacid imide anions, aliphatic carboxylic acid anions, and aromatic carboxylic acid anions containing from one to about 24 carbon atoms wherein the sum of compounds A and B is present in the amount of 1 or about 5 parts by weight per 100 parts of the phenol-blocked isocyanate.

DESCRIPTION OF THE PREFERRED EMBODIMENT

Although this invention is directed to phenol- and lower-alkyl substituted phenol-blocked isocyanates in general, it has particular application to phenol-blocked isocyanates in combination with a wide variety of active hydrogen-containing compounds to form a reaction system for a wide variety of uses such as in coatings, insecticides, herbicides, pharmaceuticals, etc. The preferred embodiment will be limited to a description of the invention in connection with a urethane coating compound such as that known as an ASTM Type 2 coating compound. This type of coating is generally formed from the combination of a blocked isocyanate and a polyester resin in an inert, volatizable liquid carrying medium that, after being applied to a substrate, is subjected to heat to raise the temperature above the release temperature of the blocked isocyanate to release the isocyanate for reaction with the polyester resin to form a polyurethane polymer coating.

The isocyanates that may be blocked for use in this embodiment are virtually any polyisocyanate, especially di- and trifunctional isocyanates. Examples of some of these include toluene-2,4-diisocyanate, 1,5-napthalenediisocyanate, cumene-2,4-diisocyanate, 4-methoxy-1,3-phenylenediisocyanate, 4-chloro-1,3-phenylenediisocyanate, 4-bromo-1,3-phenylene-diisocyanate, 4-ethoxy-1,3-phenylenediisocyanate, 2,4'-diisocyanatodiphenylether, 5,6-dimethyl-1,3-phenylenediisocyanate, 2,4-dimethyl-1,3-phenylenediisocyanate, 4,4'-diisocyanatodiphenylether, 4,6 -dimethyl-1,3-phenylenediisocyanate, 9,10-anthracenediisocyanate, 4,4'-diisocyanatodibenzyl, 3,3'-dimethyl-4,4'diisocyanatodiphenylmethane, 2,6-dimethyl-4,4'-diisocyanatodiphenyl,4,4'-diisocyanatodiphenylmethane, 2,4-diisocyanatostilbene, 3,3'-dimethyl 4,4'-diisocyanatodiphenyl, 3,3'-dimethoxy- 4,4'-diisocyanatodiphenyl, 1,4-anthracenediisocyanate, 2,5-fluorenediisocyanate, 1,8-naphthalenediisocy-anate, 2,6-diisocyanatobenzofuran, and 2,4,6-toluenetriisocyanate. It is to be understood that mixtures of two or more of these polyisocyanates may be employed. These isocyanates may be blocked generally by treating them with a stoichometric amount or less of phenol, preferably in the presence of a small amount of tertiary amine catalyst. Lower alkyl substituted phenols may also be used as blocking agents as they respond similarly to phenol with respect to the compounds of this invention. By "lower alkyl substituted phenols" is meant the lower alkyl mono- and di-substituted phenols such as the isomeric hydroxy toluenes otherwise known as ortho, para, and meta cresols. Higher alkyl and more complex substituted phenols do not respond to this invention and are therefore not included in the term "lower alkyl substituted phenols".

Among the polyesters usable for reaction with the phenol-blocked isocyanates in this invention are those prepared from the condensation of a saturated or unsaturated mono- or polycarboxylic acid and a polyhydric alcohol. Examples of suitable polyhydric alcohols include the following: glycerol; pentaerythritol; polypentaerythritol; mannitol; trimethylolpropane; sorbitol; methyltrimethylolmethane; 1,4,6-octanetriol; ethylene glycol, diethylene glycol, propylene glycol, butanediol; pentanediol; hexanediol, dodecanediol; octanediol; chloropentanediol; glycerol monoallyl ether; glycerol monoethyl ether; triethylene glycol; 2-ethylhexanediol-1,4; 3,3'-thiodipropanol; 4,4'-sulfonyldihexanol; cyclohexanediol-1,4; 1,2,6-hexanetriol; 1,3,5-hexanetriol; polyallyl alcohol; 1,3-bis (2-hydroxyethoxy) propane; 5,5'-dihydroxydiamyl ether; 2,5-dipropanol, tetrahydrofuran-2,5-dipentanol, 2,5-dihydroxytetrahydrofuran; tetrahydropyrrole-2,5-propanol; 3,4-dihydroxytetrahydropyran; 2,5-dihydroxy-3,4-dihydro-1,2 pyran; 4,4'-sulfinyldipropanol; 2,2-bis (4-hydroxyphenyl)-propane; 2,2'-bis (4-hydroxyphenyl)-methane, and the like. These polyesters should have fractional end groups containing labile hydrogen atoms for reaction with the NCO groups in the unblocked isocyanate. These include hydroxyl groups, carboxyl groups, and others.

Examples of polycarboxylic acids include the following: phthalic acid, isophthalic acid; tetrachlorophthalic acid; maleic acid; dodecylmaleic acid; octadecenylmaleic acid; fumaric acid; aconitic acid, itaconic acid, trimellitic acid; tricarballylic acid; 3,3'-thiodipropionic acid; 4,4'-sulfonyl-dihexanoic acid; 3-octenedioic-1,8 acid; 3-methyl-3-decenedioic acid; succinic acid; adipic acid; 1,4-cyclohexadiene-1,2-dicarboxylic acid; 3-methyl-3,5-cyclohexadiene-1,2-dicarboxylic acid; 8,12-eicosadienedioic acid; 8-vinyl-10-octadecenedioic acid; and the corresponding acid anhydrides, acid chlorides, and acid esters such as phthalic anhydride, phthaloyl chloride, and the dimethyl ester of phthalic acid.

The polyester and the phenol or lower alkyl substituted phenol-blocked isocyanate are generally admixed together in an inert volatizable solvent such as methyl ethyl ketone or xylene, the solution applied to the substrate, and then heated to volatilize the solvent and unblock the isocyanate. Examples of other solvents usable herein are those that do not react with either the blocked isocyanate moiety or the polyester and other reaction system moieties and include acetone, methyl isobutyl ketone, cyclohexanone, ethyl ether, tetra hydrofuran, ethyl acetate, isopropyl acetate, n-butyl acetate, methyl Cellosolve acetate, amyl acetate, ethylene glycol diacetate, ethyl lactate, methyl Cellosolve, butyl Cellosolve, benzene, toluene, naphtha, turpentine, ethylene dichloride, carbon tetrachloride, trichloroethylene, carbon disulphide, and pyridine.

The substrates that may be coated with this mixture include non-metals such as rubber, plastic, cement, fabric, wood, etc. and metals such as aluminum, brass, copper, iron, steel, etc. The application may be made by any of the conventional means such as spraying, brushing, roll coating, dipping, etc. All of these are fully contemplated herein.

One portion of the composition of this invention is herein denoted as compound A and may be defined as a tetravalent organotin compound conforming to the following general formula:

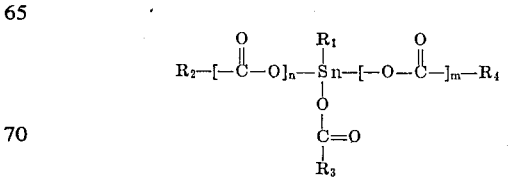

wherein $R_1$, $R_2$, $R_3$, and $R_4$ are alkyl radicals containing one to about 24 carbon atoms and wherein $n$ may be 0 or 1 and $m$ may be 0 or 1. Specifically excluded from this formula are trivalent and divalent organotin compounds for they have not been found to exhibit any of the synergistic properties disclosed herein when placed in combination with the later described quaternary ammonium compounds. The alkyl radicals in the compound may be any of those containing one to about 24 carbon atoms such as methyl, ethyl, butyl, propyl, pentyl, heptyl, octyl, nonyl, decyl, undecyl, dodecyl, tridecyl, tetradecyl, pentadecyl, hexadecyl, heptadecyl octadecyl, nonadecyl, eicosyl, heneicosyl, docosyl, tricosyl, and tetracosyl and variations thereof.

Where utilized in the form of the carboxylic acid, the alkyl radical or radicals may form the backbone of the acid radical. The acids may be mono, di, or tri carboxylic; a dicarboxylic acid may then attach to the tin via the carboxyl radical at $n$ and $m$ so that $R_2$ and $R_4$ become one and the same molecule. Examples of acids that could be used for this purpose include malonic acid, succinic acid, glutaric acid, adipic acid, pimelic acid, suberic acid, azelaic acid, sebacic acid, maleic acid, and so forth. The tricarboxylic acid may attach to the tin at three places so that $R_2$, $R_3$ and $R_4$ become one and the same molecule. Examples of acids that could be used for this purpose include tricarballylic acid and citric acid. Examples of monocarboxylic acids that may be used (to incorporate $R_2$, $R_3$, and/or $R_4$) include acetic acid, butyric acid, caproic acid, caprylic acid, capric acid, lauric acid, myristic acid, palmitic acid, stearic acid, arachidic acid, and so forth.

Specific examples of the tetravalent tin compounds of this invention include dibutyl tin dilaurate, dibutyl tin diacetate, dibutyl tin maleate, and tributyl tin acetate. Note that a fully alkylated tetravalent tin compound does not fit the above formula and is not within the metes and bounds of this invention; as will be shown later in the examples, this latter form of organotin compound (such as tetrabutyl tin) does not achieve the same results as does the compounds of this invention. Many of these tetravalent organotin compounds of this invention are commercially available; for instance, dibutyl tin dilaurate is commercially available from the Union Carbide Chemical Company and dibutyl tin diacetate and dibutyl tin maleate are commercially available from M & T Chemicals Incorporated.

The other portion of the composition of this invention is herein denoted as compound B and may be defined as a quaternary ammonium compound conforming to the following general formula:

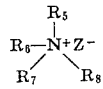

wherein $R_5$, $R_6$, $R_7$, and $R_8$ are organic radicals containing one to about 24 carbon atoms and selected from the group consisting of alkyl radicals and aralkyl radicals and wherein Z is an anion selected from the group consisting of ortho diacid imide anions, aliphatic carboxylic anions, and aromatic carboxylic acid anions all containing from one to about 24 carbon atoms.

Examples of the quaternary ammonium compounds containing ortho diacid imide anions include those of the mixed diacid imide type such as alkyl dimethyl benzyl ammonium saccharinate (an o-sulphobenzoic acid imide) where the alkyl radical contains a statistical mixture of $C_{11}$ to $C_{18}$ alkyl radicals and has the following formula:

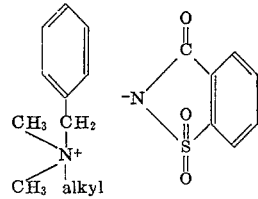

Another example is that of the ortho (homogeneous) diacid imide type such as alkyl ($C_{11}$ – $C_{18}$) dimethyl benzyl ammonium phthalimidate and has the following formula:

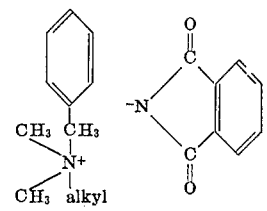

It is to be understood that these different types of compounds may be mixed together for use in this invention.

The presence of the anion portion of compound B is to solubilize the compound in the solvent of the coating compound, i.e. the solvent containing the blocked isocyanate and the polyester. For this reason, radicals $R_5$, $R_6$, $R_7$, and $R_8$ are well as the anions are to be kept at a molecular size less than about 24 carbon atoms to insure complete solubilization of the compound in the solvent. Above 24 carbon atoms compound B does not fully dissolve in the coating compound and begins to precipitate onto the substrate which not only has a deteriorating influence upon the degree of adhesive of the coating to the substrate but does not cause a sufficient reduction in the unblocking temperature. Further examples of quaternary ammonium compounds useful as compound B in this invention include hexadecyl trimethyl ammonium stearate, and dimethyl dibenzyl ammonium stearate.

Many of these compounds are commercially available; for instance, alkyl dimethyl benzyl ammonium phthalimidate and alkyl dimethyl benzyl ammonium saccharinate are commercially available from Onyx Chemical Company, Division of Millmaster Onyx Corporation, and hexadecyl trimethyl ammonium stearate, tetraethyl ammonium benzoate and tetraethyl ammonium acetate are commercially available from Eastman Organic Chemicals Company. These compounds may also be easily prepared in the laboratory.

For instance, for the preparation of dimethyl dibenzyl ammonium stearate, one dissolves 0.02 moles of sodium stearate in 22 moles of water and adds 5 moles of chloroform along with 0.02 moles of dibenzyl dimethyl ammonium chloride and then refluxes that mixture for 1 hour. About 5 moles of ethanol is then added and refluxing resumed for another 4 hours at about 55° C. Thereafter the chloroform layer is distilled off and extracted with toluene; the toluene solution is dried and stripped under vacuum to yield 0.02 moles of solid dimethyl dibenzyl ammonium stearate. Preparation of other compounds may be accomplished in a similar manner and are fully within the ambit of one skilled in the chemical art.

The basis of this invention is that the combination of these two compounds produces a synergistic lowering of the release temperature of the phenol- or lower-alkyl substituted phenol-blocked isocyanate and an unexpected increase in the heat stability of the polyurethane produced therefrom in the form of a coating. These materials may be used in a range of from about 20 to 80 parts by weight of Compound A to 80 to about 20 parts by weight of compound B and preferably 50 parts of the former to 50 parts of the latter, i.e. in an equal ratio. The combined amounts of these materials are effective in achieving the aforedescribed results when used in amounts as minute as 1 part by weight per 100 parts of the phenol-blocked isocyanate moiety to as high as 5 parts and higher. The efficiency of the combination begins to drop off rather sharply below about 1 part whereas above about 5 parts the heat stability of the resultant polyurethane begins to suffer; in addition, the added material cost above about 5 parts begins to become significant.

As an example of the lowering of the release temperature, a mixture of a polyester resin and a phenol-blocked isocyanate, the latter having a release temperature of 170° C., will in the presence of 1.72 parts by weight of alkyl ($C_{11}$ – $C_{18}$ average) dimethyl benzyl ammonium saccharinate (per 100 parts of isocyanate) exhibit a release temperature of 140° C. and in the presence of 1.72 parts by weight of dibutyl tin maleate exhibit a release temperature of 120° C. yet when 0.86 parts of each of these reagents are added thereto, the release temperature drops to 110° C. In this same example the heat stability of the resultant polyurethane with 1.72 parts of dibutyl tin maleate is 15 hours at 120° C., the heat stability of the resultant polyurethane with the 0.86 parts of each of these reagents was greater than 148 hours. Therefore, it is readily seen that this invention does produce both a synergistic lowering of the release temperature and an unexpected increase in the heat stability of the cured polymer.

For the purpose of the following examples, the unblocking or release temperature of the phenol-blocked isocyanate was determined by the following procedure. A strip of aluminum foil about 1 inch by 6 inches long was placed on the top of a temperature gradient melting point bar such as a Kofler Hot Bank. The aluminum strip was then marked with a pencil in 10° C. intervals from 80° C. to 200° C. A drop of the liquid comprising the phenol-blocked isocyanate, the polyester resin, and various compounds of this invention was placed at each of these marks on the melting point bar and heated for 15 minutes. Thereafter the strip (containing the drops) was placed in an acetone bath for 5 minutes. The acetone dissolved away the unpolymerized material. The lowest temperature marking on the strip at which a drop or portion thereof remained was taken as being the release temperature of that particular compound.

The heat stability of the polymerized material was determined as follows: Samples of the above-described liquid were brushed coated onto glass slides and heated in an air circulated oven at 120° C. until fully cured as evidenced by the achievement of a maximum Sward Rocker Hardness value of the coating that was determined by using a Sward Hardness Rocker Tester, Model C, No. 1697, made by the Gardner Laboratories Incorporated, Bethesda, Maryland, which testing procedure is described in "Physical and Chemical Examination, Paints, Varnishes, Lacquers, and Colors," Gardner & Sward, published by Gardner Laboratories, 1962, page 138. These films are then held at 120° C. until degradation of the polymers was evidenced by a reduction of one point in the Sward Rocker Hardness value.

By incorporating this invention into existing phenol- and lower-alkyl substituted phenol-blocked isocyanate systems there is opened up a number of new uses and new applications for urethane-based materials. For instance, certain pharmaceuticals and insecticides that contain heat sensitive compounds may now be made since the incorporation of this invention permits the isocyanate to be unblocked at a lower temperature and in addition, the compounds produced in this reaction have a greater storage life. Further, utilization of this invention permits the establishment of urethane based coatings and adhesives in environments heretofore restricted because of the low heat stability of the polymer.

In addition, the art is now provided with a new process for lowering the release temperature of phenol-blocked isocyanate compounds and simultaneously increasing the heat stability of the reaction product thereover mainly by treating the phenol-blocked or lower alkyl substituted phenol-blocked isocyanate composition with an admixture of the above-disclosed compounds A and B of this invention in their disclosed ratios and amounts.

Following are examples given to show one skilled in the art an indication of how to practice the invention as well as to point out certain highlights in specific compounds within the general definition of compounds A and B. Unless otherwise noted, all parts are parts by weight and all percentages are percentages by weight.

EXAMPLE 1

A phenol-blocked isocyanate-polyester resin coating compound was prepared from the ingredients listed below in Table 1 by admixing them in the solvent until a smooth blend of about 25 centipoise viscosity was obtained. The release temperature of this compound was found to be 170° C.

TABLE 1

| | |
|---|---|
| Mondur S[1] | 246.35 parts |
| Ethylene butylene adipate polyester (2000 mw) | 360.00 parts |
| Parlon S–125[2] | 4.00 parts |
| Methyl ethyl ketone solvent | 798.65 parts |
| Total: | 1409.00 parts |

[1] phenol-blocked triisocyanate, Mobay Chemical Company
[2] chlorinated natural rubber, Hercules Powder Company

EXAMPLE 2

A number of compounds corresponding to the formula of compound B, listed below in Table 2A, were admixed with dibuyl tin dilaurate, which corresponds to the formula of compound A, in various ratios and these combinations physically blended with portions of the phenol-blocked isocyanate polyester resin coating compound of Example 1. The release temperatures of the phenol-blocked isocyanate and the heat stabilities of the resultant polyurethane coatings were determined for each sample by the procedures described earlier and are listed below in Table 2B.

TABLE 2A

Compound B
  Alkyl[1] dimethyl benzyl ammonium saccharinate = ADBAS
  Alkyl[1] dimethyl benzyl ammonium phthalimidate = ADBAP
  Hexadecyl trimethyl ammonium stearate = HTAS
  Dimethyl dibenzyl ammonium stearate = DBAS
  Tetraethyl ammonium benzoate = TEAB
  Tetraethyl ammonium acetate = TEAA
Compound A
  Dibutyl tin dilaurate = DTD
[1] mixture of $C_{11} - C_{18}$

TABLE 2B

| Sample | 1 | 2 | 3 | 4 | 5 | 6 | 7 | 8 | 9 | 10 | 11 |
|---|---|---|---|---|---|---|---|---|---|---|---|
| Mondur S in coating compound (parts) | 100 | 100 | 100 | 100 | 10 | 100 | 100 | 100 | 100 | 100 | 100 |
| ADBAS (parts) | | 1.72 | 1.43 | 1.14 | 0.86 | 0.57 | 0.29 | | | | |
| ADBAP (parts) | | | | | | | | | 0.86 | 0.71 | 0.57 |
| HTAS (parts) | | | | | | | | | | | |
| DBAS (parts) | | | | | | | | | | | |
| TEAB (parts) | | | | | | | | | | | |
| TEAA (parts) | | | | | | | | | | | |
| DTD (parts) | | | 0.29 | 0.57 | 0.86 | 1.14 | 1.43 | 1.72 | | 0.29 | 0.57 |
| Release temperature (° C.) | 170 | 140 | 120 | 120 | 110 | 110 | 120 | 120 | 110 | 100 | 100 |
| Heat stability (hours) | >148 | | | | 80 | 9 | 9 | 5 | | >148 | 80 |

TABLE 2B—Continued

| Sample | 12 | 13 | 14 | 15 | 16 | 17 | 18 | 19 | 20 | 21 | 22 |
|---|---|---|---|---|---|---|---|---|---|---|---|
| Mondur S in coating compound (parts) | 100 | 100 | 100 | 100 | 100 | 100 | 100 | 100 | 100 | 100 | 100 |
| ADBAS (parts) | | | | | | | | | | | |
| ADBAP (parts) | 0.43 | 0.29 | 0.15 | | | | | | | | |
| HTAS (parts) | | | | | 1.72 | 1.43 | 1.14 | 0.86 | 0.57 | 0.29 | |
| DBAS (parts) | | | | | | | | | | | |
| TEAB (parts) | | | | | | | | | | | |
| TEAA (parts) | | | | | | | | | | | |
| DTD (parts) | 0.86 | 1.14 | 1.43 | 1.72 | | 0.29 | 0.57 | 0.86 | 1.14 | 1.43 | 1.72 |
| Release temperature (° C.) | 100 | 110 | 110 | 120 | 110 | 100 | 100 | 100 | 110 | 110 | 120 |
| Heat stability (hours) | 56 | 56 | 15 | 5 | | >148 | >148 | 38 | | | 5 |

| Sample | 23 | 24 | 25 | 26 | 27 | 28 | 29 | 30 | 31 | 32 | 33 |
|---|---|---|---|---|---|---|---|---|---|---|---|
| Mondur S in coating compound (parts) | 100 | 100 | 100 | 100 | 100 | 100 | 100 | 100 | 100 | 100 | 100 |
| ADBAS (parts) | | | | | | | | | | | |
| ADBAP (parts) | | | | | | | | | | | |
| HTAS (parts) | | | | | | | | | | | |
| DBAS (parts) | 1.72 | 1.43 | 1.14 | 0.86 | 0.57 | 0.29 | | | | | |
| TEAB (parts) | | | | | | | | 1.72 | 1.43 | 1.14 | 0.86 |
| TEAA (parts) | | | | | | | | | | | |
| DTD (parts) | | 0.29 | 0.57 | 0.86 | 1.14 | | 1.72 | | 0.29 | 0.57 | 0.86 |
| Release temperature (° C.) | 110 | 100 | 100 | 100 | 100 | 100 | 120 | 100 | 90 | 90 | 90 |
| Heat stability (hours) | >148 | >148 | >148 | 148 | 15 | 13 | 5 | >148 | 38 | 22 | 15 |

| Sample | 34 | 35 | 36 | 37 | 38 | 39 | 40 | 41 | 42 | 43 |
|---|---|---|---|---|---|---|---|---|---|---|
| Mondur S in coating compound (parts) | 100 | 100 | 100 | 100 | 100 | 100 | 100 | 100 | 100 | 100 |
| ADBAS (parts) | | | | | | | | | | |
| ADBAP (parts) | | | | | | | | | | |
| HTAS (parts) | | | | | | | | | | |
| DBAS (parts) | | | | | | | | | | |
| TEAB (parts) | 0.57 | 0.29 | | | | | | | | |
| TEAA (parts) | | | | 1.72 | 1.43 | 1.14 | 0.86 | 0.57 | 0.29 | |
| DTD (parts) | 1.14 | 1.43 | 1.72 | | 0.29 | 0.57 | 0.86 | 1.14 | 1.43 | 1.72 |
| Release temperature (° C.) | 90 | 90 | 120 | 100 | 90 | 90 | 90 | 90 | 100 | 120 |
| Heat stability (hours) | 9 | 9 | 5 | >148 | 38 | 22 | 13 | 9 | 9 | 5 |

This example shows that whereas separately treating the phenol-blocked isocyanate polyester coating compound with compounds corresponding to the formula of compound B and with compounds corresponding to the formula of compound A lowers the release temperature, treating the same coating compound with a combination of compounds A and B provides a synergistic lowering of the release temperature below that of either compound alone. In addition, this example shows that the combination of compounds A and B increases the heat stability of the resultant polyurethane coating, at the lowered release temperature, beyond the heat stability when compound A was used alone.

EXAMPLE 3

A number of compounds corresponding to the formula of compound A, listed below in Table 3A, were admixed with alkyl dimethyl benzyl ammonium saccharinate, which corresponds to the formula of compound B, in various ratios and these admixtures blended with portions of the phenol-blocked isocyanate polyester resin coating compound of Example 1. The release temperatures of the blocked-isocyanate and the heat stabilities of the resultant polyurethane coatings were determined for each sample by the procedures described earlier and are listed below in Table 3B.

TABLE 3A

Compound A
  Dibutyl tin diacetate = DBTDA
  Dibutyl tin maleate = DBTM
  Tributyl tin acetate = TBTA
Compound B
  Alkyl [1] dimethyl benzyl ammonium saccharinate = ADBAS
  [1] mixture of $C_{11}$–$C_{18}$

TABLE 3B

| Sample | 1 | 2 | 3 | 4 | 5 | 6 | 7 | 8 | 9 | 10 | 11 |
|---|---|---|---|---|---|---|---|---|---|---|---|
| Mondur S in coating compound (parts) | 100 | 100 | 100 | 100 | 100 | 100 | 100 | 100 | 100 | 100 | 100 |
| DBTDA (parts) | | 1.72 | 1.43 | 1.14 | 0.86 | 0.57 | 0.29 | | | | |
| DBTM (parts) | | | | | | | | | 1.72 | 1.43 | 1.14 |
| TBTA (parts) | | | | | | | | | | | |
| TBTR (parts) | | | | | | | | | | | |
| ADBAS (parts) | | | 0.29 | 0.57 | 0.86 | 1.14 | 1.43 | 1.72 | | 0.29 | 0.57 |
| Release temperture (° C ) | 170 | 110 | 100 | 100 | 100 | 110 | 120 | 140 | 120 | 110 | 110 |
| Heat stability (hours) | >148 | 7 | 38 | 148 | >148 | | | | 15 | 38 | 56 |

| Sample | 12 | 13 | 14 | 15 | 16 | 17 | 18 | 19 | 20 | 21 | 22 |
|---|---|---|---|---|---|---|---|---|---|---|---|
| Mondur S in coating compound (parts) | 100 | 100 | 100 | 100 | 100 | 100 | 100 | 100 | 100 | 100 | 100 |
| DBTDA (parts) | | | | | | | | | | | |
| DBTM (parts) | 0.86 | 0.57 | 0.29 | | | | | | | | |
| TBTA (parts) | | | | | 1.72 | 1.43 | 1.14 | 0.86 | 0.57 | 0.29 | |
| TBTR (parts) | | | | | | | | | | | |
| ADBAS (parts) | 0.86 | 1.14 | 1.43 | 1.72 | | 0.29 | 0.57 | 0.86 | 1.14 | 1.43 | 1.72 |
| Release temperature (° C.) | 110 | 120 | 130 | 140 | 120 | 120 | 110 | 110 | 110 | 120 | 140 |
| Heat stability (hours) | >148 | | | | 15 | 38 | >148 | >148 | >148 | | |

EXAMPLE 4

A number of compounds that do not correspond to the formula of compound A listed below in Table 4A, were admixed with alkyl dimethyl benzyl ammonium saccharinate, which corresponds to the formula of Compound B, and these admixtures blended with portions of the phenol-blocked isocyanate polyester resin coating compound of Example 1. The release temperatures (as a function of time) and the heat stabilities of the resultant polyurethane coatings were determined for each sample by the procedures described earlier and are listed below in Table 4B.

TABLE 4A

Compounds
Tetrabutyl tin = TBT
Tributyl tin chloride = TBTCl
Stannous octoate = S Oct
Stannous oleate = S Ole
Stannous linoleate = SLin Compound B
Alkyl [(1)] dimethyl benzyl ammonium saccharinate (ADBAS)

[(1)] mixture of $C_{11} - C_{18}$

TABLE 4B

| Sample | 1 | 2 | 3 | 4 | 5 | 6 | 7 | 8 | 9 | 10 | 11 |
|---|---|---|---|---|---|---|---|---|---|---|---|
| Mondur S in coating compound (parts) | 100 | 100 | 100 | 100 | 100 | 100 | 100 | 100 | 100 | 100 | 100 |
| TBT (parts) | | 1.72 | 1.43 | 1.14 | 0.86 | 0.57 | 0.29 | | | | |
| TBTCl (parts) | | | | | | | | | 1.72 | 1.43 | 1.14 |
| SOct (parts) | | | | | | | | | | | |
| S Ole (parts) | | | | | | | | | | | |
| S Lin (parts) | | | | | | | | | | | |
| ADBAS (parts) | | | 0.29 | 0.57 | 0.86 | 1.14 | 1.43 | 1.72 | | 0.29 | 0.57 |
| Release temp. 1st day (° C.) | 170 | 160 | 150 | 150 | 150 | 140 | 140 | 140 | 160 | 150 | 140 |
| Release temp. 2nd day (° C.) | | | | | | | | | | | |
| Release temp. 4th day (° C.) | | | | | | | | | | | |
| Heat stability (hours) | >148 | >148 | >148 | >148 | >148 | >148 | >148 | >148 | >148 | >148 | >148 |

| Sample | 12 | 13 | 14 | 15 | 16 | 17 | 18 | 19 | 20 | 21 |
|---|---|---|---|---|---|---|---|---|---|---|
| Mondur S in coating compound (parts) | 100 | 100 | 100 | 100 | 100 | 100 | 100 | 100 | 100 | 100 |
| TBT (parts) | | | | | | | | | | |
| TBTCl (parts) | 0.86 | 0.57 | 0.29 | | | | | | | |
| SOct (parts) | | | | | 1.72 | 0.86 | | | | |
| S Ole (parts) | | | | | | | 1.72 | 0.86 | | |
| S Lin (parts) | | | | | | | | | 1.72 | 0.86 |
| ADBAS (parts) | 0.86 | 1.14 | 1.43 | 1.72 | | 0.86 | | 0.86 | | 0.86 |
| Release temp. 1st day (° C.) | 140 | 140 | 140 | 140 | 120 | 130 | 110 | 130 | 110 | 120 |
| Release temp. 2nd day (° C.) | | | | | 150 | 140 | 140 | 140 | 140 | 140 |
| Release temp. 4th day (° C.) | | | | | 160 | 150 | 180 | 150 | 170 | 150 |
| Heat stability (hours) | >148 | >148 | >148 | >148 | | | | | | |

This example shows that combinations of compounds not corresponding to the formula of compound A and compounds that do correspond to the formula of compound B do not synergistically reduce the release temperature of the phenol-blocked isocyanate and that combinations of divalent tin compounds and compounds corresponding to the formula of compound B do not have an effective shelf or pot life.

What is claimed is:

1. A composition comprising a mixture of:
   a. compound A which is a tetravalent tin compound conforming to the following formula:

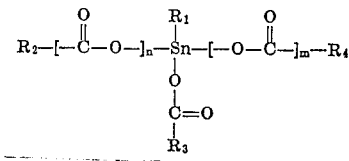

wherein $R_1$, $R_2$, $R_3$, and $R_4$ are alkyl radicals containing one to about 24 carbon atoms, wherein $n$ may be 0 or 1, and wherein $m$ may be 0 or 1;

b. compound B which is a quaternary ammonium compound conforming to the following formula:

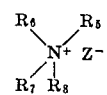

wherein $R_5$, $R_6$, $R_7$, and $R_8$ are organic radicals containing one to about 24 carbon atoms and are selected from the group consisting of alkyl radicals and aralkyl radicals, wherein Z is an anion selected from the group consisting of ortho diacid imide anions, aliphatic carboxylic acid anions, and aromatic carboxylic acid anions containing from about one to about 24 carbon atoms;

c. wherein compound A and compound B are in a weight ratio varying from about 1:4 to about 4:1 and wherein compound A and compound B are present in a total amount varying from about 1 to about 5 parts; and, d. about 100 parts of a phenol-blocked isocyanate.

2. The composition of claim 1 wherein Compound A is dibutyl tin dilaurate and compound B is alkyl dimethyl benzyl ammonium saccharinate wherein said alkyl is comprised of a mixture of $C_{11}$ to $C_{18}$ radicals.

3. The composition of claim 1 wherein compound B is alkyl dimethyl benzyl ammonium phthalimidate wherein said alkyl is comprised of a mixture of $C_{11}$ to $C_{18}$ radicals.

4. The composition of claim 1 wherein compound B is hexadecyl trimethyl ammonium stearate.

5. The composition of claim 1 wherein compound B is dimethyl dibenzyl ammonium stearate.

6. The composition of claim 1 wherein compound B is tetraethyl ammonium acetate.

7. The composition of claim 1 wherein compound B is tetraethyl ammonium benzoate.

8. The composition of claim 1 wherein compound A is dibutyl tin diacetate.

9. The composition of claim 1 wherein compound A is dibutyl tin maleate.

10. The composition of claim 1 wherein compound A is tributyl tin acetate.

11. The composition of claim 1 wherein the ratio of compound A to compound B is about 1 to 1 by weight.

12. The composition of claim 1 wherein said phenol-blocked isocyanate comprises a lower alkyl substituted phenol-blocked isocyanate.

13. A composition which is curable to an elastomeric coating, having improved heat stability, by heating at about 100°–140° C. for about 15 minutes, said composition comprising a mixture of a polyester resin, a phenol-blocked isocyanate and a composition comprising:
   a. compound A which is a tetravalent tin compound conforming to the following formula:

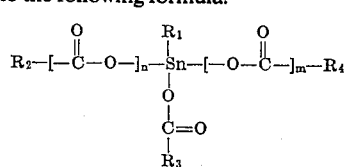

wherein $R_1$, $R_2$, $R_3$, and $R_4$ are alkyl radicals containing one to about 24 carbon atoms, wherein $n$ may be 0 or 1, and wherein $m$ may be 0 or 1;

b. compound B which is a quaternary ammonium compound conforming to the following formula:

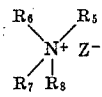

wherein $R_5$, $R_6$, $R_7$, and $R_8$ are organic radicals containing one to about 24 carbon atoms and are selected from the group consisting of alkyl radicals and aralkyl radicals, wherein Z is an anion selected from the group consisting of ortho diacid imide anions, aliphatic carboxylic acid anions, and aromatic carboxylic acid anions, containing from one to about 24 carbon atoms; and, c. wherein compound A and compound B are in a weight ratio varying from about 1:4 to about 4:1 and wherein compound A and compound B are present in a total amount varying from about 1 to about 5 parts per 100 parts of said phenol-blocked isocyanate.

14. A process for producing a cured elastomeric coating comprising heating at about 100°–140° C. for about 15 minutes a composition comprising a polyester resin, a phenol-blocked isocyanate, and composition comprising:

a. compound A which is a tetravalent tin compound conforming to the following formula:

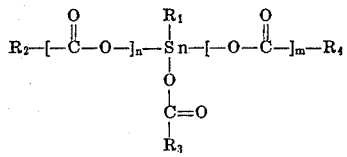

wherein $R_1$, $R_2$, $R_3$, and $R_4$ are alkyl radicals containing one to about 24 carbon atoms, wherein $n$ may be 0 or 1, and wherein $m$ may be 0 or 1;

b. compound B which is a quaternary ammonium compound conforming to the following formula:

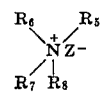

wherein $R_5$, $R_6$, $R_7$, and $R_8$ are organic radicals containing one to about 24 carbon atoms and are selected from the group consisting of alkyl radicals and aralkyl radicals, wherein Z is an anion selected from the group consisting of ortho diacid imide anions, aliphatic carboxylic acid anions, and aromatic carboxylic acid anions, containing from one to about 24 carbon atoms; and, c. wherein compound A and compound B are present in a weight ratio varying from about 1:4 to about 4:1.

15. A process for producing a cured adhesive comprising heating at about 100°–140° C. for about 15 minutes a composition comprising a polyester resin, a phenol-blocked isocyanate, and composition comprising:

a. compound A which is a tetravalent tin compound conforming to the following formula:

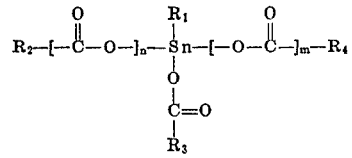

wherein $R_1$, $R_2$, $R_3$, and $R_4$ are alkyl radicals containing one to about 24 carbon atoms, wherein $n$ may be 0 or 1, and wherein $m$ may be 0 or 1;

b. compound B which is a quaternary ammonium compound conforming to the following formula:

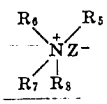

wherein $R_5$, $R_6$, $R_7$, and $R_8$ are organic radicals containing one to about 24 carbon atoms and are selected from the group consisting of alkyl radicals and aralkyl radicals, wherein Z is an anion selected from the group consisting of ortho diacid imide anions, aliphatic carboxylic acid anions, and aromatic carboxylic acid anions, containing from one to about 24 carbon atoms; and, c. wherein compound A and compound B are present in a weight ratio varying from about 1:4 to about 4:1.

16. A composition comprising a mixture of:

a. compound A which is a tetravalent tin compound conforming to the following formula:

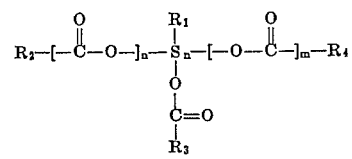

wherein $R_1$, $R_2$, $R_3$, and $R_4$ are alkyl radicals containing one to about 24 carbon atoms, wherein $n$ may be 0 or 1, and wherein $m$ may be 0 or 1;

b. compound B which is a quaternary ammonium compound conforming to the following formula:

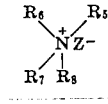

wherein $R_5$, $R_6$, $R_7$, and $R_8$ are organic radicals containing one to about 24 carbon atoms and are selected from the group consisting of alkyl radicals and aralkyl radicals, wherein Z is an anion selected from the group consisting of ortho diacid imide anions, aliphatic carboxylic acid anions, and aromatic carboxylic acid anions containing from one to about 24 carbon atoms; and, c. wherein compound A and compound B are in a weight ratio varying from about 1:4 to about 4:1.

* * * * *

GT-574

UNITED STATES PATENT OFFICE
CERTIFICATE OF CORRECTION

Patent No. 3,668,186      Dated June 6, 1972

Inventor(s) Duncan et al

It is certified that error appears in the above-identified patent and that said Letters Patent are hereby corrected as shown below:

Column 1, line 24, "NOC" should read -- NCO --.
Column 2, line 68, "reaction" should read -- reactive --.
Column 3, lines 7 and 8, the phrase "containing to about 24 carbon atoms" should read -- containing 1 to about 24 carbon atoms --.
Column 3, line 27, the phrase "1 or about" should read -- 1 to about --.
Column 6, line 5, the formula

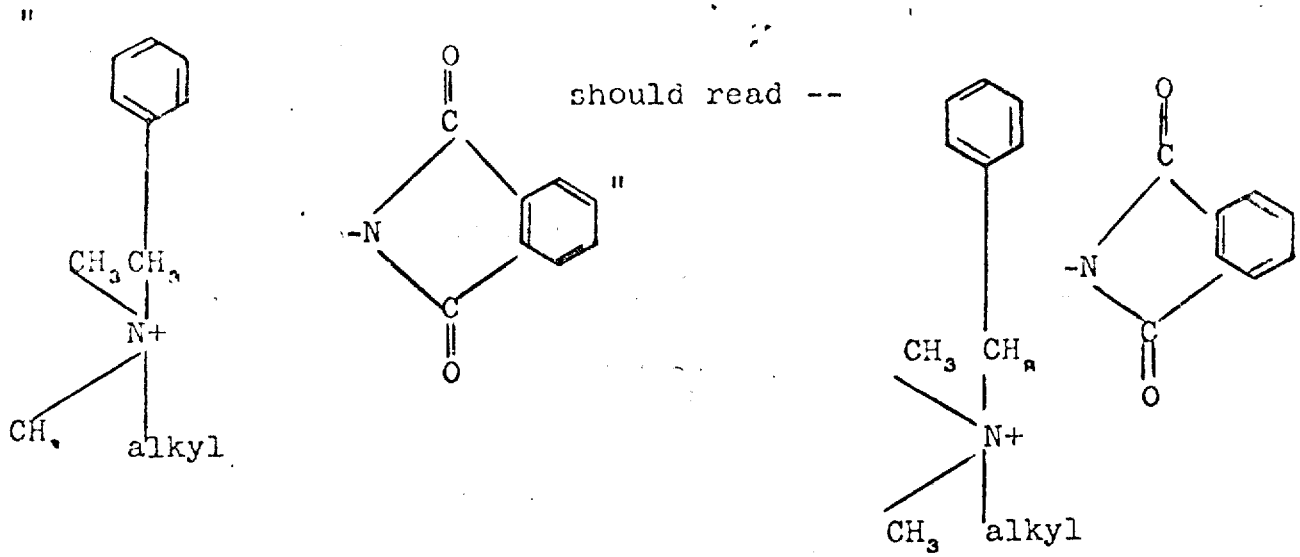

should read --

Column 6, line 17, "are" should read -- as --.
Column 8, Table 2B, "Mondur S in coating compound (parts) --- 100 100 100 100 10" should read -- Mondur S in coating compound (parts) --- 100 100 100 100 100 --.

Signed and sealed this 12th day of December 1972.

(SEAL)
Attest:

EDWARD M. FLETCHER, JR.
Attesting Officer

ROBERT GOTTSCHALK
Commissioner of Patents